L. S. MORSE.
TIRE TREAD FASTENER.
APPLICATION FILED MAY 31, 1917.
1,270,191.
Patented June 18, 1918.
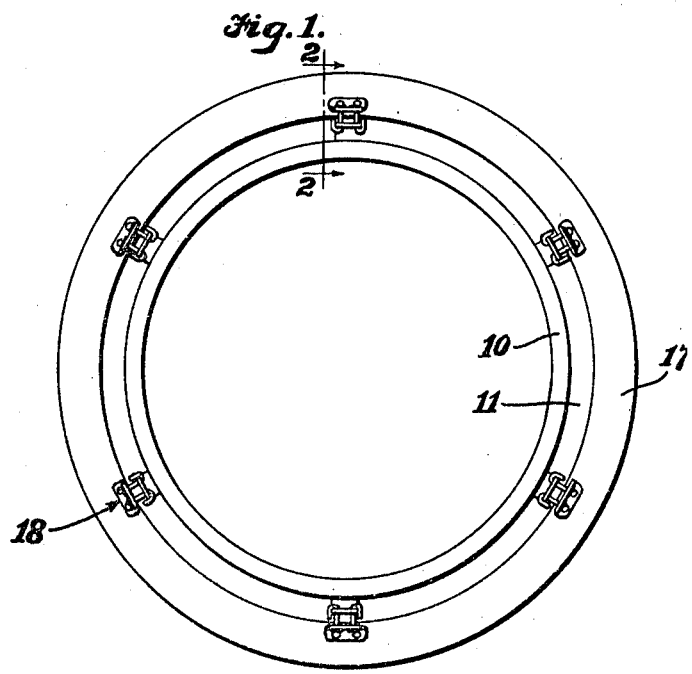
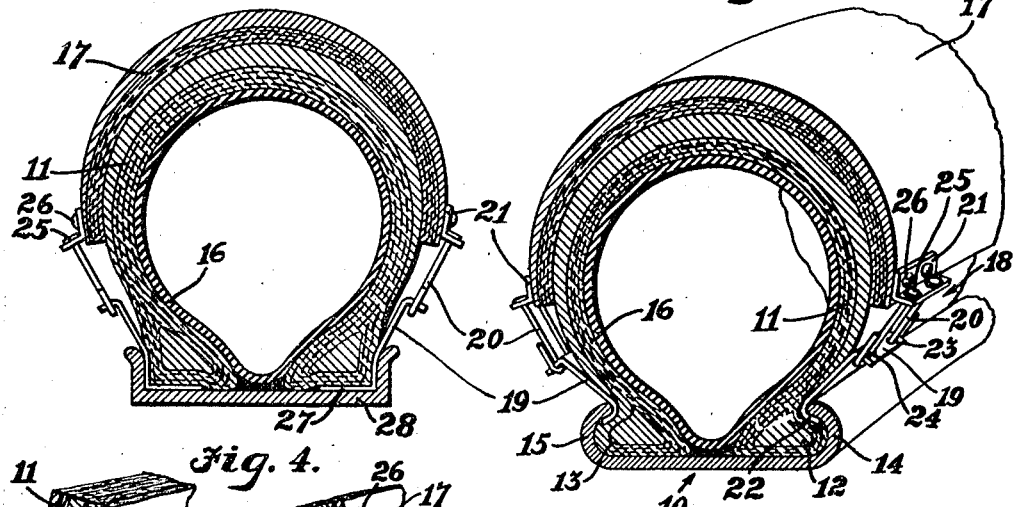
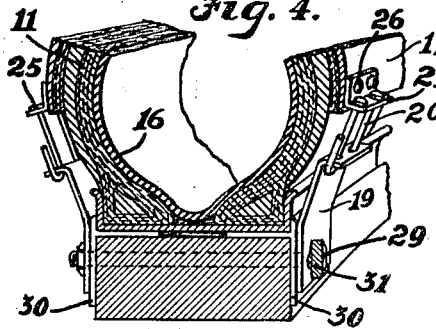
Inventor
Lulan S. Morse
by Hazard & Miller
Att'ys.

UNITED STATES PATENT OFFICE.

LULAN S. MORSE, OF OCEANPARK, CALIFORNIA.

TIRE-TREAD FASTENER.

1,270,191.	Specification of Letters Patent.	Patented June 18, 1918.

Application filed May 31, 1917. Serial No. 172,061.

*To all whom it may concern:*

Be it known that I, LULAN S. MORSE, a citizen of the United States, residing at Oceanpark, in the county of Los Angeles and State of California, have invented new and useful Improvements in Tire-Tread Fasteners, of which the following is a specification.

This invention relates to a tire and particularly pertains to a re-tread therefor.

It is the principal object of this invention to provide a tire fastener by which a re-tread may be secured over the tire casing and will engage the flanges of the clencher rim upon which the tire is mounted without alteration of existing parts and without possibility of objectionable wear upon the tire.

Another object of this invention is to provide a fastener formed of simple parts, easily mounted upon the re-tread and so designed as to permit the individual fasteners to be adjusted after the re-tread has been placed in position and the tire inflated, thereby preventing objectionable binding of the parts, or allowing a looseness which would produce wear upon the casing.

Another object of this invention is to provide a fastener which is so constructed as to permit the re-tread to have movement with the tire when it is subjected to shock and thereby yieldably support the re-tread upon the tire casing.

It is a further object of this invention to provide a re-tread fastener which is formed of few inexpensive parts easily manufactured and readily applied or exchanged.

Other objects will appear hereinafter.

The invention is illustrated, by way of example, in the accompanying drawings in which:

Figure 1 is a view in side elevation illustrating a tire fitted with a re-tread and the fasteners with which the present invention is concerned.

Fig. 2 is a view in transverse section and perspective, as seen through the tire on the line 2—2 of Fig. 1, more clearly illustrating the formation of the fastener and its application to a re-tread and tire of the clencher bead type.

Fig. 3 is a view in transverse section of a tire of the straight side type fitted with the re-tread and its fasteners.

Fig. 4 is a view in transverse section and perspective illustrating another manner in which the re-tread fasteners may be secured to the vehicle wheel.

Referring more particularly to the drawings, 10 indicates the annular clencher rim embodied in ordinary motor vehicle construction and upon which is detachably mounted a tire casing 11, the beads 12 and 13 of which are engaged by the marginal flanges 14 and 15 of the rim. Mounted within the casing is a pneumatic tire tube 16. It will be understood that all of the elements previously referred to are of common construction and that the tire casing is adapted to be fitted with a re-tread member 17 secured by fasteners 18 with which the present invention is concerned.

Broadly considered, the fastener is composed of a detachable plate 19, connecting links 20 and a fastening angle-plate 21. As shown in Fig. 2 of the drawings, the plate 19 is formed with an out-turned end 22 which is positioned beneath the in-turn marginal edge of the side flanges of the rim 10. The body portion of the plate extends along the side of the tire casing 11 and is bent outwardly substantially at right-angles to the side of the casing at its opposite end. Perforations 23 and 24 are formed through the outwardly bent end portion and are adapted to receive the ends of the connecting links 20. These links are formed of material having considerable strength which may be bent by the use of suitable pliers or other tools. The outer ends of the links have heads 25 which bear against the outward extending portion of the connecting plate 21 and prevent the links from entirely passing through openings in the plate similar to the openings 23 and 24 in the flange of the plate. The two links extend parallel to each other and after passing through the openings 23 and 24 are bent upon themselves and the bent portions are oppositely disposed in relation to each other and the plate. The angle-plate 21 is permanently secured by rivets 26 to the sides of the re-tread 17 and along the marginal edges thereof. These plates, as shown in Fig. 1, occur at given distances around the circumference of the re-treads and are arranged in pairs upon the opposite sides thereof.

In the modified form of the invention shown in Fig. 3 of the drawings, the fastening plate 21 and the connecting links 20 are identical in the construction to those shown in Fig. 2 of the drawings. The plate, however, is formed in a different manner in order to be adaptable for use with tires having straight sides. This plate is provided with the out-turned flange connecting with the body of the plate along its outer edge and also has an extension 27 which rests upon the tire rim 28 and beneath the circumference of the casing member 11. It will thus be evident that the action of this modification will be identical with that of the preceding device.

Reference being had to Fig. 4 of the drawings it will be seen that the bolts disposed around the felly of a clencher rim, as indicated by the numeral 29 and which hold clamping lugs 30 in position, is utilized as a detachable mounting for the plates. In this case the inner specially formed extensions of the plates are eliminated and an opening 31 is formed through the plate to receive the bolt 29 and thereby be held in position.

In operation, the tire casing 11 with its inner tube, is mounted upon its mounting rim and before it is inflated the plates 19 are placed in position. In the structure shown in Fig. 2 of the drawings, the plate is placed with its out-turned flange 22 in engagement with the clencher flanges of the rim 10. In the form of the structure shown in Fig. 3, the in-turned flange 27 is interposed between the tire and the mounting rim 28. The form shown in Fig. 4 is mounted upon the bolt extending through the felly. In all of these instances the body portion of the plates extend outwardly in a radial manner along the opposite sides of the tire casing and have their flanges extending outwardly. After all of the plates to be used have been mounted, as described, the re-tread 17 is positioned around the outer circumference of the casing. This re-tread has previously been supplied with a series of fastening angle-plates 21 which have been riveted to the sides of the casing at intervals corresponding to the number of fasteners to be used. When the casing is in place these angle-plates are brought to register in radial alinement with the plates and thereafter the connecting links 20 are positioned through the openings in the outwardly extending portions of the angle-plate and the plate. The head of each connecting member is brought to bear upon the flange of the angle-plate and the inner ends of the connecting members are passed through the openings in the flange of the plate. After this has been done the tire is inflated to a desired pressure and the connecting members are then bent outwardly around the opposite ends of the outer flange of the plate, as particularly shown in Fig. 2 of the drawings. Attention is directed to the fact that due to this operation, the re-tread is accurately adjusted to the inflated casing without the use of expensive adjusting means. When the tire is used, the parallel connecting links are movably fastened to the plate and permit the tire and re-tread to move circumferentially of the wheel a limited distance and prevent the tire from creeping within the re-tread when subjected to road shock.

It will thus be seen that the fastener here provided is simple, both in construction and manner of mounting and that it permits desirable adjustment of the fasteners, as well as limited movement of the re-tread under certain conditions.

While I have shown the preferred construction of my tire tread fastener as now known to me, it will be understood that various changes in the combination, construction and arrangement of parts may be made by those skilled in the art without departing from the spirit of my invention as claimed.

I claim:

1. In a fastener for re-tread members, the combination with a pneumatic tire, of a re-tread adapted to be positioned thereover, fastening elements disposed at intervals along the marginal edges of the re-tread, plates forming part of said fastening elements and by which the re-tread is secured in position around the tire, and a pair of separate links of adjustable lengths connecting said re-tread with said plates whereby the re-tread may be adapted to tires of various sizes and may have circumferential movement in relation thereto.

2. A fastener for tire re-treads, comprising an angle plate adapted to be fixed to the edge of the re-tread, a plate adapted to be detachably secured to the wheel upon which the tire is mounted, and a pair of link connecting members of adjustable lengths provided to secure the angle plate and the plate together in a flexible manner to secure the retread over tires of various sectional dimensions.

3. A fastener for tire re-treads, comprising an angle plate, one leg of which is secured to the side of said re-tread and the other leg of which extends outwardly from the tire, a plate detachably secured to the wheel upon which said tire is mounted, said plate having an out-turned flange corresponding to the out-turned leg of the angle plate, and connecting members mounted through the out-turned leg of the angle plate and adapted to be adjustably and yieldably connected to the up-turned flange of the plate to secure the retread upon tires of various sectional diameters.

4. A fastener for retreads comprising an angle plate, one leg of which is fixed to the outer face of a retread member and along one marginal edge thereof, the other leg extending outwardly from the retread and being formed with a pair of perforations spaced in relation to each other, semi-rigid connecting members positioned through said perforations and having heads which hold them in connection with the angle plate, and a plate having out-turned opposite ends, one of which is formed with perforations through which the ends of the connecting members may pass and be bent against removal, the opposite end being positioned in engagement with a clencher rim upon which a tire is mounted and over which the retread is positioned.

In testimony whereof I have signed my name to this specification.

LULAN S. MORSE.